US012469429B2

(12) United States Patent
Lee et al.

(10) Patent No.: US 12,469,429 B2
(45) Date of Patent: Nov. 11, 2025

(54) DISPLAY DEVICE

(71) Applicant: Samsung Display Co., LTD., Yongin-si (KR)

(72) Inventors: Seunghee Lee, Yongin-si (KR); Ji-Hyun Ka, Yongin-si (KR); Wonkyu Kwak, Yongin-si (KR); Minku Lee, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 18/175,389

(22) Filed: Feb. 27, 2023

(65) Prior Publication Data

US 2024/0071286 A1 Feb. 29, 2024

(30) Foreign Application Priority Data

Aug. 26, 2022 (KR) ........................ 10-2022-0107594

(51) Int. Cl.
*G09G 3/20* (2006.01)
*G09G 3/3233* (2016.01)

(52) U.S. Cl.
CPC ......... *G09G 3/2096* (2013.01); *G09G 3/3233* (2013.01); *G09G 2300/0819* (2013.01); *G09G 2300/0842* (2013.01); *G09G 2300/0861* (2013.01); *G09G 2310/08* (2013.01); *G09G 2320/0233* (2013.01); *G09G 2330/028* (2013.01); *G09G 2354/00* (2013.01)

(58) Field of Classification Search
CPC ............... G09G 3/2096; G09G 3/3233; G09G 2300/0819; G09G 2300/0842; G09G 2300/0861; G09G 2310/08; G09G 2320/0233; G09G 2330/028; G09G 2354/00
See application file for complete search history.

(56) References Cited

U.S. PATENT DOCUMENTS

| | | | | |
|---|---|---|---|---|
| 2006/0007077 A1* | 1/2006 | Joo | G09G 3/3208 345/77 |
| 2017/0154567 A1* | 6/2017 | Ko | G06F 3/04184 |
| 2017/0345366 A1* | 11/2017 | Jang | G09G 3/3225 |
| 2019/0114966 A1* | 4/2019 | Park | G09G 3/2003 |
| 2020/0082760 A1* | 3/2020 | Ogata | G09G 3/3258 |
| 2020/0265778 A1* | 8/2020 | Lee | G09G 3/3233 |
| 2021/0174737 A1* | 6/2021 | Park | G09G 3/20 |
| 2021/0193020 A1* | 6/2021 | Ka | G09G 3/3266 |

(Continued)

FOREIGN PATENT DOCUMENTS

KR 10-1167515 A 7/2012

*Primary Examiner* — Md Saiful A Siddiqui
(74) *Attorney, Agent, or Firm* — Womble Bond Dickinson (US) LLP

(57) ABSTRACT

A display device includes: a display panel including pixels; a data driver configured to output data voltages to the pixels; a gate driver configured to output a write gate signal to write the data voltages to the pixels having an inactivation level in a frame stop period; a timing controller configured to control the data driver and the gate driver; and a voltage generator configured to apply a first bias voltage to first pixels to which the data voltages are written before the frame stop period among the pixels, and to apply a second bias voltage to second pixels to which the data voltages are written after the frame stop period among the pixels.

15 Claims, 11 Drawing Sheets

(56) References Cited

U.S. PATENT DOCUMENTS

| | | | | | |
|---|---|---|---|---|---|
| 2021/0343238 | A1 | 11/2021 | Okabe et al. | | |
| 2022/0076627 | A1 | 3/2022 | Kim et al. | | |
| 2022/0180812 | A1 | 6/2022 | Lin et al. | | |
| 2023/0196998 | A1* | 6/2023 | Han | G09G 3/3233 | 345/212 |
| 2023/0206854 | A1* | 6/2023 | Kim | G09G 3/3266 | 345/699 |
| 2023/0215364 | A1* | 7/2023 | Lim | G09G 3/3266 | 345/691 |

* cited by examiner

DISPLAY DEVICE

CROSS-REFERENCE TO RELATED APPLICATION

The present application claims priority to Korean Patent and the benefit of Application No. 10-2022-0107594, filed on Aug. 26, 2022 in the Korean Intellectual Property Office KIPO, the entire content of which is incorporated herein by reference.

BACKGROUND

1. Field

Aspects of some embodiments of the present inventive concept relate to a display device.

2. Description of the Related Art

Generally, a display device may include a display panel, a timing controller, gate driver, and a data driver. The display panel may include a plurality of gate lines, a plurality of data lines, and a plurality of pixels electrically connected to the gate lines and the data lines. The gate driver may provide gate signals to the gate lines. The data driver may provide data voltages to the data lines. The timing controller may control the gate driver and the data driver.

The display device may further include a touch panel for recognizing an input action or touch event by a user. When the touch panel is touched by a conductive object such as a finger or a stylus pen, the touch panel may generate an electrical signal to detect a presence and location of the touch. The touch panel may be mounted on an upper surface of a display panel such as an organic light emitting display panel or a liquid crystal display panel, or may be formed in a display panel, and may be divided into a resistive film method, a capacitive method, an electromagnetic field method, an infrared method, a surface acoustic wave (SAW) method, and a near field imaging (NFI) method, and the like.

For a touch sensing operation for sensing a touch, the display device may have a frame stop period between display operation for displaying images, and may perform the touch sensing operation in the frame stop period. However, in one frame, a difference in luminance may occur before and after the frame stop period.

The above information disclosed in this Background section is only for enhancement of understanding of the background and therefore the information discussed in this Background section does not necessarily constitute prior art.

SUMMARY

Aspects of some embodiments of the present inventive concept relate to a display device. For example, aspects of some embodiments of the present inventive concept relate to a display device having a frame stop period.

Aspects of some embodiments of the present inventive concept include a display device that may minimize or reduce a difference in luminance occurring before and after a frame stop period.

According to some embodiments of the present inventive concept, a display device may include a display panel including pixels, a data driver configured to output data voltages to the pixels, a gate driver configured to output a write gate signal for writing the data voltages to the pixels having an inactivation level in a frame stop period, a timing controller configured to control the data driver and the gate driver, and a voltage generator configured to apply a first bias voltage to first pixels to which the data voltages are written before the frame stop period among the pixels, and to apply a second bias voltage to second pixels to which the data voltages are written after the frame stop period among the pixels.

According to some embodiments, the second bias voltage may be smaller than the first bias voltage.

According to some embodiments, each of the pixels may include a driving transistor, the gate driver is configured to output a bias gate signal to the pixels, the first bias voltage may be applied to the driving transistor of each of the first pixels in response to the bias gate signal, and the second bias voltage may be applied to the driving transistor of each of the second pixels in response to the bias gate signal.

According to some embodiments, the bias gate signal may have an inactivation level in the frame stop period.

According to some embodiments, the display device may further include an emission driver configured to output an emission signal for emitting the pixels to the pixels, and the timing controller may be configured to maintain an output of the emission signal in the frame stop period.

According to some embodiments, the timing controller may be configured to maintain an output of the bias gate signal in the frame stop period, and a time between an activation timing of the bias gate signal and an activation timing of the emission signal may be constant.

According to some embodiments, the voltage generator may be configured to apply a first gate initialization voltage to the first pixels and to apply a second gate initialization voltage to the second pixels, each of the pixels may include a driving transistor, the gate driver may be configured to output an initialization gate signal to the pixels, the first gate initialization voltage may be applied to a control electrode of the driving transistor of each of the first pixels in response to the initialization gate signal, and the second gate initialization voltage may be applied to the control electrode of the driving transistor of each of the second pixels in response to the initialization gate signal.

According to some embodiments, the second gate initialization voltage may be greater than the first gate initialization voltage.

According to some embodiments, the initialization gate signal may have a inactivation level in the frame stop period.

According to some embodiments, the voltage generator may be configured to apply a first anode initialization voltage to the first pixels and to apply a second anode initialization voltage to the second pixels, each of the pixels may include a light emitting element, the gate driver may be configured to output a bias gate signal to the pixels, the first anode initialization voltage may be applied to the light emitting element of each of the first pixels in response to the bias gate signal, and the second anode initialization voltage may be applied to the light emitting element of each of the second pixels in response to the bias gate signal.

According to some embodiments, the second anode initialization voltage may be smaller than the first anode initialization voltage.

According to some embodiments, the timing controller may be configured to perform a touch sensing operation in the frame stop period.

According to some embodiments of the present inventive concept, a display device may include a display panel including pixels, a data driver configured to output data voltages to the pixels, a gate driver configured to output a write gate signal for writing the data voltages to the pixels having an inactivation level in a frame stop period, a timing controller configured to control the data driver and the gate driver, and a voltage generator configured to apply a bias voltage to the pixels and to vary the bias voltage after the frame stop period.

According to some embodiments, the voltage generator may be configured to decrease the bias voltage after the frame stop period.

According to some embodiments, the voltage generator may be configured to apply a gate initialization voltage to the pixels, and to vary the gate initialization voltage after the frame stop period, each of the pixels may include a driving transistor, the gate driver may be configured to output an initialization gate signal to the pixels, and the gate initialization voltage may be applied to a control electrode of the driving transistor of each of the pixels in response to the initialization gate signal.

According to some embodiments, the voltage generator may be configured to increase the gate initialization voltage after the frame stop period.

According to some embodiments, the voltage generator may be configured to apply an anode initialization voltage to the pixels, and to vary the anode initialization voltage after the frame stop period, each of the pixels may include a light emitting element, the gate driver may be configured to output a bias gate signal to the pixels, and the anode initialization voltage may be applied to the light emitting element of each of the pixels in response to the bias gate signal.

According to some embodiments, the voltage generator may be configured to decrease the anode initialization voltage after the frame stop period.

According to some embodiments of the present inventive concept, a display device may include a display panel including pixels, a data driver configured to output data voltages to the pixels, a gate driver configured to output a write gate signal for writing the data voltages to the pixels having an inactivation level in a frame stop period and to output a bias gate signal for applying a bias voltage to a driving transistor included in each of the pixels having an activation level, an emission driver configured to output an emission signal for emitting the pixels to the pixels, a timing controller configured to control the data driver, the gate driver, and the emission driver, and a voltage generator configured to apply the bias voltage to the pixels.

According to some embodiments, a time between an activation timing of the bias gate signal and an activation timing of the emission signal may be constant.

Therefore, the display device according to some embodiments may compensate for an insufficient bias time of second pixels compared to first pixels by applying a first bias voltage to the first pixels to which data voltages are written before a frame stop period among pixels and applying a second bias voltage to second pixels to which the data voltages are written after the frame stop period among the pixels. Accordingly, the display device may minimize or reduce a difference in luminance occurring before and after the frame stop period.

In addition, the display device may minimize or reduce a difference in luminance occurring before and after the frame stop period by applying a first gate initialization voltage to first pixels and a second gate initialization voltage to second pixels.

Further, the display device may compensate for an insufficient anode initialization time of second pixels compared to first pixels by applying a first anode initialization voltage to first pixels and a second anode initialization voltage to second pixels. Accordingly, the display device may minimize or reduce a difference in luminance occurring before and after the frame stop period.

Also, the display device may have the same bias time for first pixel and second pixel by outputting a write gate signal for writing data voltages to pixels having an inactivation level in a frame stop period, outputting a bias gate signal for applying a bias voltage to a driving transistor included in each of the pixels having an activation level, and outputting an emission signal for emitting the pixels to the pixels. Accordingly, the display device may minimize or reduce a difference in luminance occurring before and after the frame stop period.

However, the characteristics of embodiments according to the present inventive concept are not limited to the above-described characteristics, and may be variously expanded without departing from the spirit and scope of the embodiments according to present inventive concept.

DETAILED DESCRIPTION

Hereinafter, aspects of some embodiments of the present inventive concept will be explained in more detail with reference to the accompanying drawings.

Figure 1:
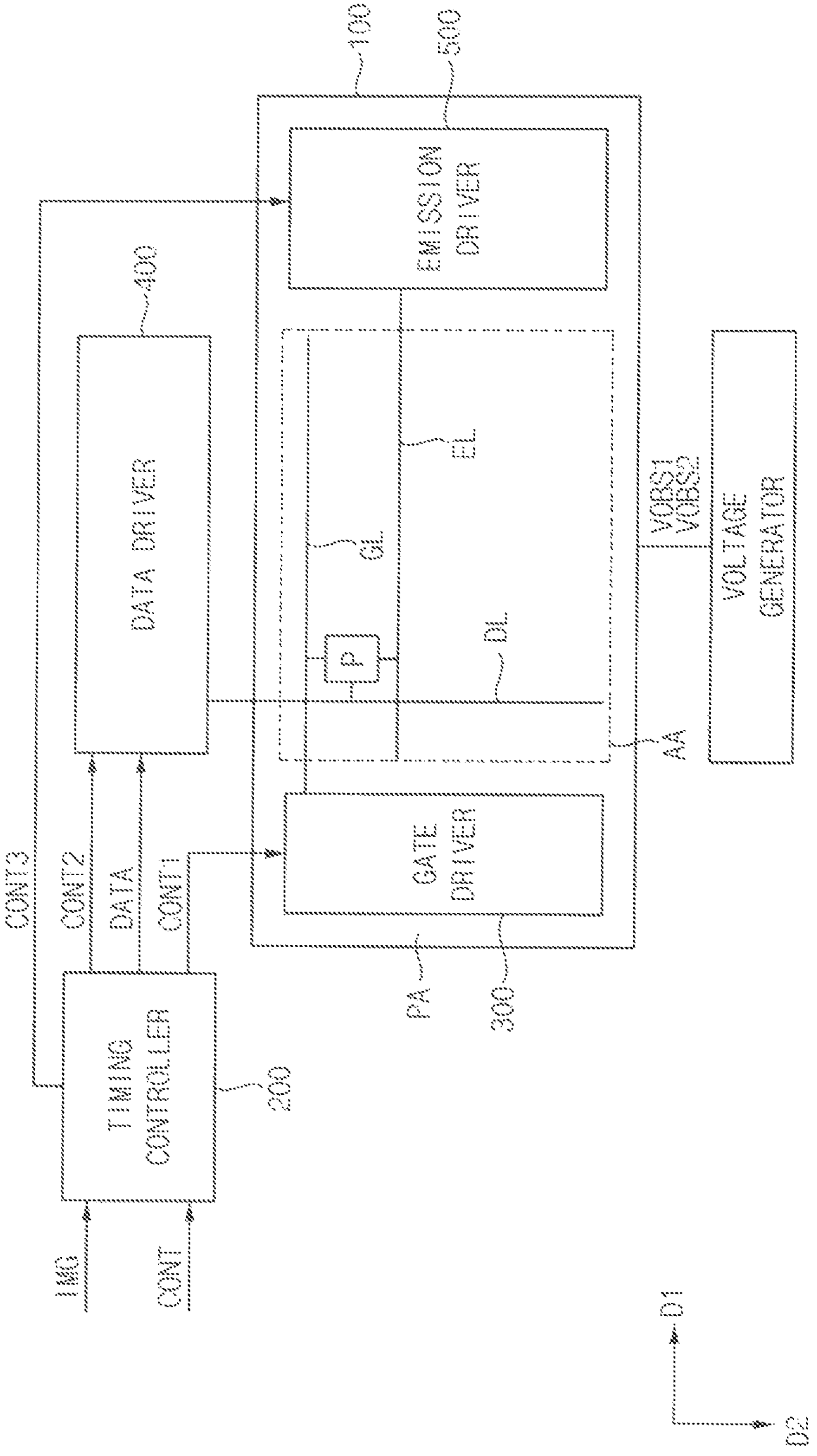
FIG. 1 is a block diagram illustrating a display device according to some embodiments of the present inventive concept.

FIG. 1 is a block diagram illustrating a display device according to some embodiments of the present inventive concept.

Referring to FIG. 1, the display device may include a display panel 100, a timing controller 200, a gate driver 300, a data driver 400, an emission driver 500, and a voltage generator 600. According to some embodiments, the timing controller 200 and the data driver 400 may be integrated into one chip.

The display panel 100 has a display region AA on which an image is displayed and a peripheral region PA adjacent to the display region AA. According to some embodiments, the gate driver 300 and the emission driver 500 may be mounted on the peripheral region PA of the display panel 100.

The display panel 100 may include a plurality of gate lines GL, a plurality of data lines DL, a plurality of emission lines EL, and a plurality of pixels P electrically connected to the data lines DL, the gate lines GL, and the emission lines EL. The gate lines GL and the emission lines EL may extend in a first direction D1 and the data lines DL may extend in a second direction D2 crossing the first direction D1.

The timing controller 200 may receive input image data IMG and an input control signal CONT from a host processor (e.g., a graphic processing unit; GPU). For example, the input image data IMG may include red image data, green image data and blue image data. According to some embodiments, the input image data IMG may further include white image data. For another example, the input image data IMG may include magenta image data, yellow image data, and cyan image data. The input control signal CONT may include a master clock signal and a data enable signal. The input control signal CONT may further include a vertical synchronizing signal and a horizontal synchronizing signal.

The timing controller 200 may generate a first control signal CONT1, a second control signal CONT2, a third control signal CONT3, and data signal DATA based on the input image data IMG and the input control signal CONT.

The timing controller 200 may generate the first control signal CONT1 for controlling operation of the gate driver 300 based on the input control signal CONT and output the first control signal CONT1 to the gate driver 300. The first control signal CONT1 may include a vertical start signal and a gate clock signal.

The timing controller 200 may generate the second control signal CONT2 for controlling operation of the data driver 400 based on the input control signal CONT and output the second control signal CONT2 to the data driver 400. The second control signal CONT2 may include a horizontal start signal and a load signal.

The timing controller 200 may generate the third control signal CONT3 for controlling operation of the emission driver 500 based on the input control signal CONT and output the third control signal CONT3 to the emission driver 500. The third control signal CONT3 may include a vertical start signal and an emission clock signal.

The timing controller 200 may receive the input image data IMG and the input control signal CONT, and generate the data signal DATA. The timing controller 200 may output the data signal DATA to the data driver 400.

The gate driver 300 may generate gate signals for driving the gate lines GL in response to the first control signal CONT1 input from the timing controller 200. The gate driver 300 may output the gate signals to the gate lines GL. For example, the gate driver 300 may sequentially output the gate signals to the gate lines GL.

The data driver 400 may receive the second control signal CONT2 and the data signal DATA from the timing controller 200. The data driver 400 may convert the data signal DATA into data voltages having an analog type. The data driver 400 may output the data voltage to the data lines DL.

The emission driver 500 may generate gate signals for driving the emission lines EL in response to the third control signal CONT3 input from the timing controller 200. The emission driver 500 may output the emission signals to the emission lines EL. For example, the emission driver 500 may sequentially output the emission signals to the emission lines EL.

The voltage generator 600 may generate a first bias voltage VOBS1 and a second bias voltage VOBS2. The voltage generator 600 may output the first bias voltage VOBS1 and the second bias voltage VOBS2 to the display panel 100. For example, the voltage generator 600 may output the first bias voltage VOBS1 and the second bias voltage VOBS2 to the pixels P.

Figure 2:
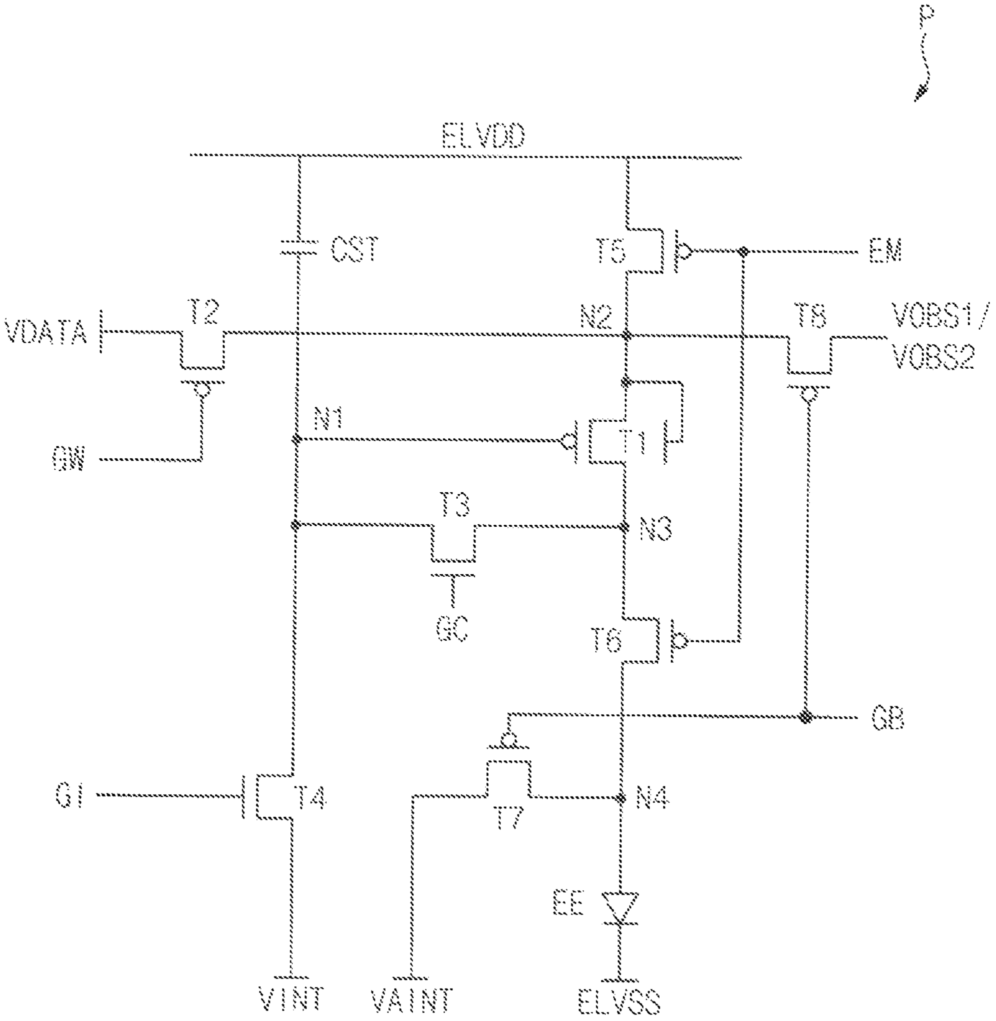
FIG. 2 is a circuit diagram illustrating an example of pixels of the display device of FIG. 1.

FIG. 2 is a circuit diagram illustrating an example of the pixels P of the display device of FIG. 1.

Referring to FIGS. 1 and 2, the gate driver 300 may output a write gate signal GW for writing the data voltages VDATA to the pixels P. The emission driver 500 may output the emission signal EM for emitting the pixels P.

Each of the pixels P may include a first transistor T1 (i.e., a driving transistor T1) including a control electrode connected to a first node N1, a first electrode connected to a second node N2, and a second electrode connected to a third node N3, a second transistor T2 including a control electrode receiving the write gate signal GW, a first electrode receiving the data voltage VDATA, and a second electrode connected to the second node N2, a third transistor T3 including a control electrode receiving a compensation gate signal GC, a first electrode connected to the third node N3, and a second electrode connected to the first node N1, a fourth transistor T4 including a control electrode receiving an initialization gate signal GI, a first electrode receiving a gate initialization voltage VINT, and a second electrode connected to the first node N1, a fifth transistor T5 including a control electrode receiving the emission signal EM, a first electrode receiving a first power voltage ELVDD (e.g., a high power voltage), and a second electrode connected to the second node N2, a sixth transistor T6 including a control electrode receiving the emission signal EM, a first electrode connected to the third node N3, and a second electrode connected to a fourth node N4, a seventh transistor T7 including a control electrode receiving a bias gate signal GB, a first electrode receiving an anode initialization voltage VAINT, and a second electrode connected to the fourth node N4, an eighth transistor T8 including a control electrode receiving the bias gate signal GB, a first electrode receiving the first bias voltage VOBS1 or the second bias voltage VOBS2, and a second electrode connected to the second node N2, a storage capacitor CST including a first electrode receiving the first power voltage ELVDD and a second electrode connected to the first node N1, and a light emitting element EE including a first electrode connected to the fourth node N4 and a second electrode receiving a second power voltage ELVSS (e.g., a low power voltage). However, embodiments according to the present inventive concept are not limited thereto. For example, each of the pixels P may have a 3T1C structure composed of 3 transistors and 1 capacitor, a 5T2C structure composed of 5 transistors and 2 capacitors, a 7T1C structure composed of 7 transistors and 1 capacitor, a 9T1C structure composed of 9 transistors and 1 capacitor. etc, and a bias transistor for applying a bias voltage (e.g., VOBS1, VOBS2) to the driving transistor T1 (e.g., the eighth transistor T8). The circuit of each of the pixels P may include additional components or fewer components without departing from the spirit and scope of embodiments according to the present disclosure.

According to some embodiments, the driving transistor T1 may further include a lower electrode. For example, the lower electrode of the driving transistor T1 may be connected to the first electrode of the driving transistor T1.

The first, second, and fifth to eighth transistors T1, T2, T5, T6, T7, and T8 may be implemented as p-channel metal oxide semiconductor (PMOS) transistors. In this case, a low voltage level may be an activation level, and a high voltage level may be an inactivation level. For example, when a signal applied to a control electrode of the PMOS transistor has the low voltage level, the PMOS transistor may be turned on. For example, when a signal applied to the control electrode of the PMOS transistor has the high voltage level, the PMOS transistor may be turned off.

The third and fourth transistors T3 and T4 may be implemented as n-channel metal oxide semiconductor (NMOS) transistors. In this case, the low voltage level may be a inactivation level, and the high voltage level may be an activation level. For example, when a signal applied to a control electrode of the NMOS transistor has the low voltage level, the NMOS transistor may be turned off. For example, when a signal applied to the control electrode of the NMOS transistor has the high voltage level, the NMOS transistor may be turned on.

However, embodiments according to the present inventive concept are not limited thereto. For example, the first, second, and fifth to eighth transistors T1, T2, T5, T6, T7, and T8 may be NMOS transistors. For example, the third and fourth transistors T3 and T4 may be PMOS transistors.

For example, in an initialization period, the initialization gate signal GI may have the activation level, and the fourth transistor T4 may be turned on. Accordingly, the gate initialization voltage VINT may be applied to the control electrode (i.e., the first node N1) of the driving transistor T1 (i.e., a gate initialization operation). That is, the control electrode of the driving transistor T1 (i.e., the data voltage VDATA written to the storage capacitor CST) may be initialized.

For example, in a data writing period, the write gate signal GW and the compensation gate signal GC may have the activation level, and the second transistor T2 and the third transistor T3 may be turned on. Accordingly, the data voltage VDATA may be written to the storage capacitor CST (i.e., a data write operation).

For example, in a bias period, the bias gate signal GB may have the activation level, and the seventh transistor T7 and the eighth transistor T8 may be turned on. Accordingly, the anode initialization voltage VAINT may be applied to the first electrode (i.e., an anode electrode) of the light emitting element EE (i.e., an anode initialization operation), and the first bias voltage VOBS1 or the second bias voltage VOBS2 may be applied to the first electrode of the driving transistor T1 (i.e., a bias operation). That is, the anode electrode of the light emitting element EE may be initialized, and a bias of the driving transistor T1 may be on-bias.

For example, in a light emitting period, the emission signal EM may have the activation level, and the fifth transistor T5 and the sixth transistor T6 may be turned on. Accordingly, the first power voltage ELVDD may be applied to the driving transistor T1 to generate a driving current, and the driving current may be applied to the light emitting element EE (i.e., a light emission operation). That is, the light emitting element EE may emit light with a luminance corresponding to the driving current.

Figure 3:
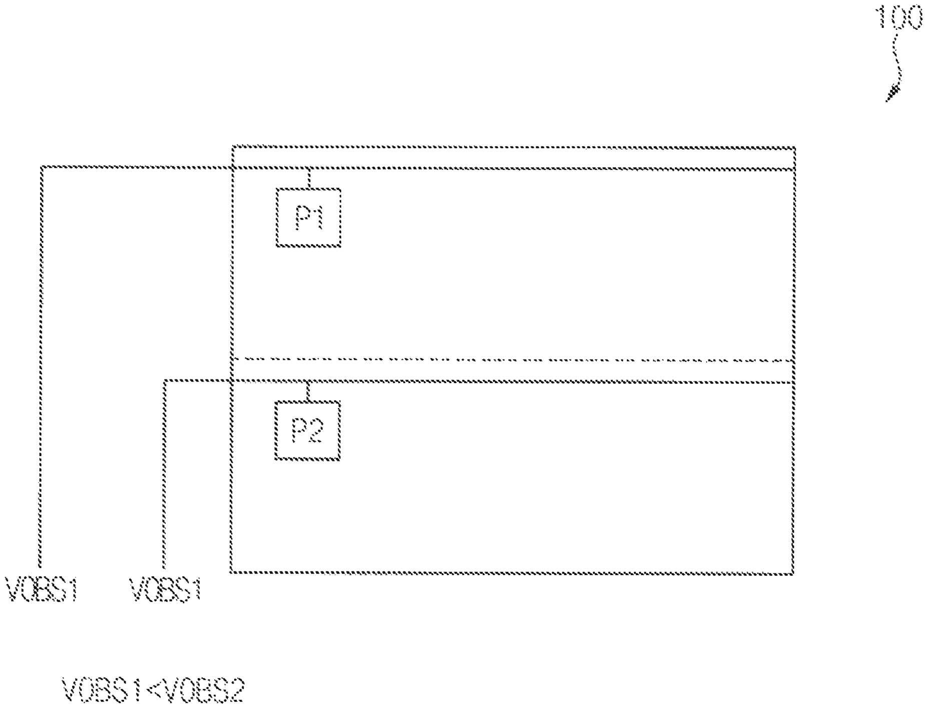
FIG. 3 is a block diagram illustrating an example of a first pixel and a second pixel of the display device of FIG. 1.
Figure 4:
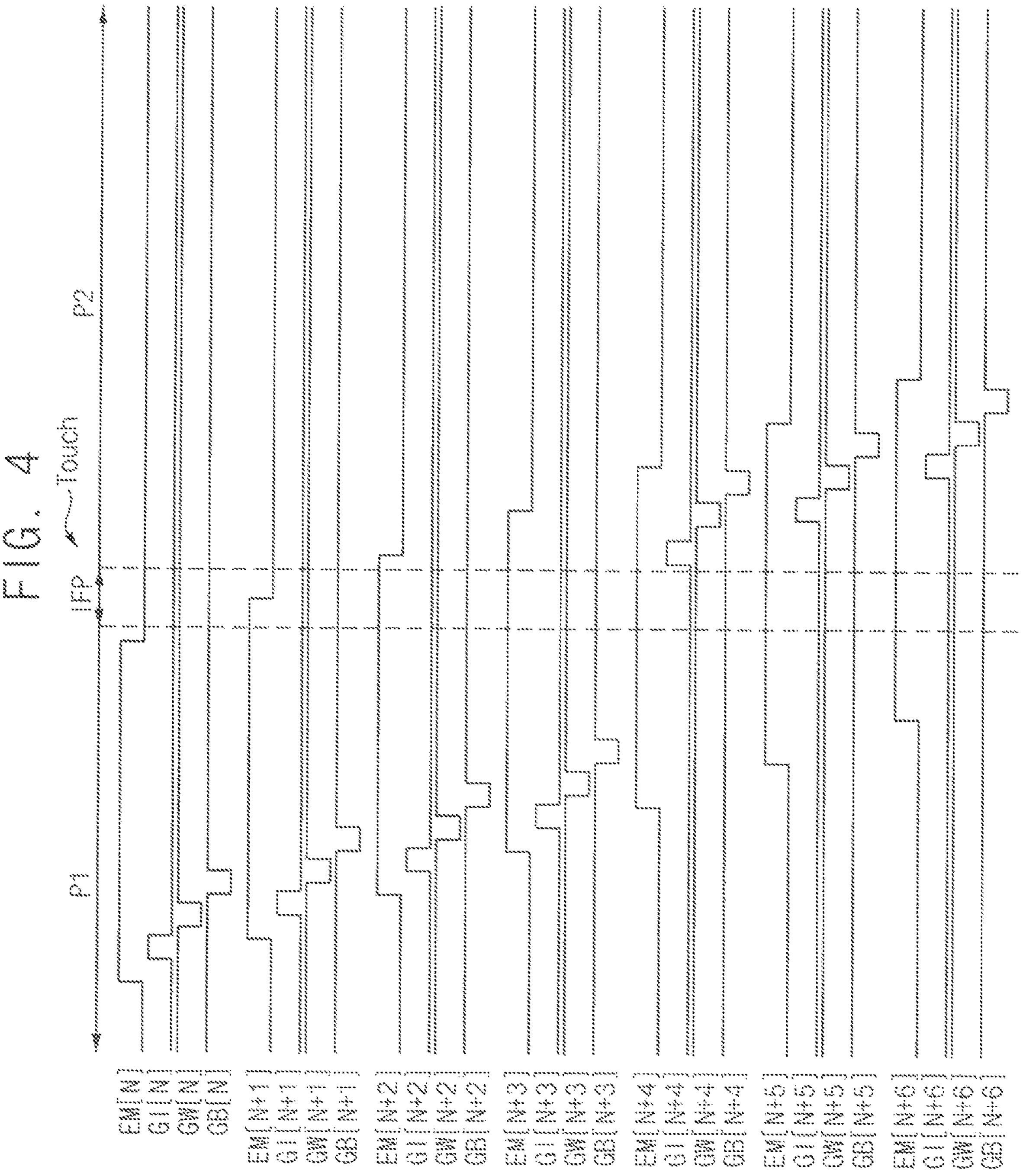
FIG. 4 is a timing diagram illustrating an example in which the display device of FIG. 1 is driven in one frame.

FIG. 3 is a block diagram illustrating an example of a first pixel P1 and a second pixel P1 of the display device of FIG. 1, and FIG. 4 is a timing diagram illustrating an example in which the display device of FIG. 1 is driven in one frame. FIG. 4 illustrates the activation levels of the emission signal EM, the write gate signal GW, and the bias gate signal GB as the low voltage level, and the activation level of the initialization gate signal GI as the high voltage level.

Referring to FIGS. 1 to 4, FIG. 4 illustrates that the emission signal EM is sequentially applied to Nth to N+6th emission lines EL (e.g., EM[N], EM[N+1], EM[N+6]). FIG. 4 illustrates that the write gate signal GW is sequentially applied to Nth to N+6th gate lines GL (e.g., GW[N], GW[N+1], GW[N+6]). FIG. 4 illustrates that the bias gate signal GB is sequentially applied to Nth to N+6th gate lines GL (e.g., GB[N], GB[N+1], GB[N+6]). Here, N is a positive integer.

The gate driver 300 may output the write gate signal GW having the inactivation level in the frame stop period IFP. For example, the timing controller 200 may temporarily suspend output of the write gate signal GW in the frame stop period IFP. The gate driver 300 may output the bias gate signal GB having the inactivation level in the frame stop period IFP. For example, the timing controller 200 may temporarily suspend output of the bias gate signal GB in the frame stop period IFP. The gate driver 300 may output the initialization gate signal GI having the inactivation level in the frame stop period IFP. For example, the timing controller 200 may temporarily suspend output of the initialization gate signal GI in the frame stop period IFP. The emission driver 500 may output the emission signal EM having the activation level in the frame stop period IFP. For example, the timing controller 200 may maintain output of the emission signal EM in the frame stop period IFP. The timing controller 200 may perform a touch sensing operation in the frame stop period IFP.

For example, the gate initialization operation, the data writing operation, the anode initialization operation, and the bias operation may be sequentially performed up to a N+2th pixel row. Thereafter, in the frame stop period IFP, the timing controller 200 may stop the gate initialization operation, the data writing operation, the anode initialization operation, and the bias operation, and may perform the touch sensing operation. After the frame stop period IFP ends, the gate initialization operation, the data writing operation, the anode initialization operation, and the bias operation may be sequentially performed from a N+3th pixel row. On the other hand, the light emission operation may be performed regardless of the frame stop period IFP. That is, the emission signal EM may be sequentially output regardless of the frame stop period IFP.

The pixel row may include pixels P connected to one gate line GL and one emission line EL. For example, the timing controller 200 may sequentially drive the pixel rows.

The display device may further include a touch panel for recognizing an input action or event by a user. The display device may recognize a touch when there is the input action or event by the user on the touch panel (i.e., the touch sensing operation). When the display device simultaneously performs the touch sensing operation and a display operation (i.e., operations for displaying an image, such as the gate initialization operation, the data writing operation, the bias operation, the anode initialization operation, and the light emission operation), Each operation may affect other operation. Accordingly, the display device may have the frame stop period IFP and may perform the touch sensing operation in the frame stop period IFP. In addition, by separating the touch sensing operation and the display operation, the touch sensing operation and the display operation may operate at different frequencies.

The voltage generator 600 may apply the first bias voltage VOBS1 to the first pixels P1 to which the data voltages VDATA are written before the frame stop period IFP among the pixels P, and the second bias voltage VOBS2 may be applied to the second pixels P2 in which the data voltages VDATA are written after the frame stop period IFP among the pixels P. For example, the first bias voltage VOBS1 may be applied to the driving transistor T1 of each of the first pixels P1 in response to the bias gate signal GB. For example, the second bias voltage VOBS2 may be applied to the driving transistor T1 of each of the second pixels P2 in response to the bias gate signal GB. The second bias voltage VOBS2 may be smaller than the first bias voltage VOBS1.

For example, the first pixels P1 may be pixels P to which the write gate signal GW having the activation level is applied before the frame stop period IFP in one frame. For example, the second pixels P2 may be pixels P to which the write gate signal GW having the activation level is applied after the frame stop period IFP in one frame.

For example, as shown in FIG. 3, the voltage generator 600 may apply the first bias voltage VOBS1 and the second bias voltage VOBS1 to the first pixels P1 and the second pixels P2 through separate voltage lines. Accordingly, the first bias voltage VOBS1 may be applied only to the first pixels P1, and the second bias voltage VOBS2 may be applied only to the second pixels P2.

As shown in FIG. 4, a bias time of the second pixels P2 may be shorter than a bias time of the first pixels P1. The bias time may be a time after the bias operation is performed until the light emission operation is performed. For example, the bias time may be a time from when the bias gate signal GB becomes the activation level until the emission signal EM becomes the activation level.

That is, if the first bias voltage VOBS1 and the second bias voltage VOBS2 are the same, a difference in luminance may be generated between the first pixels P1 and the second pixels P2 due to the difference in the bias time. However, because the second bias voltage VOBS2 smaller than the first bias voltage VOBS1 is applied to the second pixels P2, the bias of the second pixels P2 may be quickly turned on-bias. Accordingly, the display device may compensate for the insufficient bias time of the second pixel P2 compared to the first pixel P1. Accordingly, the display device may minimize or reduce the difference in luminance occurring before and after the frame stop period IFP.

Figure 5:
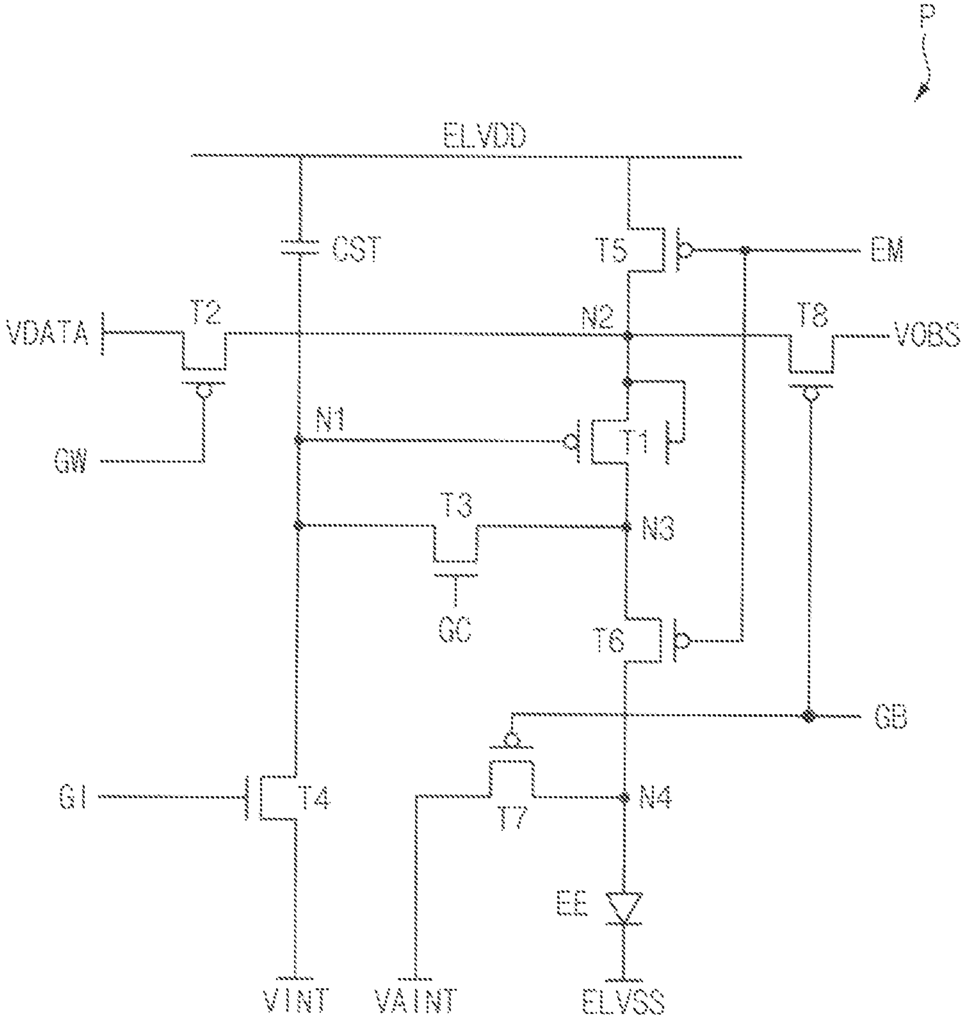
FIG. 5 is a circuit diagram illustrating an example of pixels P of a display device according to some embodiments of the present inventive concept.
Figure 6:
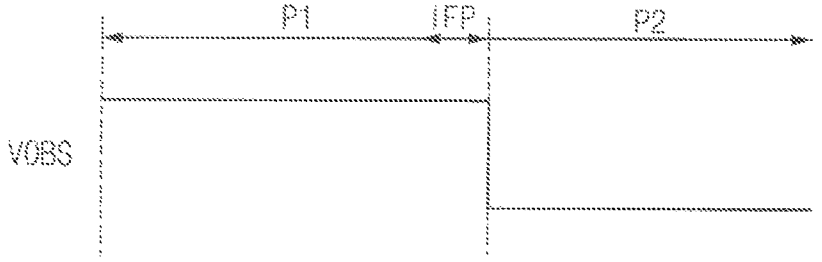
FIG. 6 is a diagram illustrating an example of a bias voltage of the display device of FIG. 5.

FIG. 5 is a circuit diagram illustrating an example of the pixels P of a display device according to some embodiments of the present inventive concept, and FIG. 6 is a diagram illustrating an example of a bias voltage VOBS of the display device of FIG. 5.

The display device according to some embodiments is substantially the same as the display device of FIG. 1 except for the bias voltage VOBS. Thus, the same reference numerals are used to refer to the same or similar element, and any repetitive explanation will be omitted.

Referring to FIGS. 1, 5, and 6, the voltage generator 600 may apply the bias voltage VOBS to the pixels P and vary the bias voltage VOBS after the frame stop period IFP. However, the present inventive concept is not limited thereto. For example, the present inventive concept may vary the bias voltage VOBS when the frame stop period IFP starts.

Each of the pixels P may include an eighth transistor T8 including a control electrode receiving the bias gate signal GB, a first electrode receiving the bias voltage VOBS, and a second electrode connected to the second node N2.

For example, in a bias period, the bias gate signal GB may have the activation level, and the seventh transistor T7 and the eighth transistor T8 may be turned on. Accordingly, the anode initialization voltage VATIN may be applied to the first electrode (i.e., the anode electrode) of the light emitting element EE (i.e., the anode initialization operation), and the bias voltage VOBS may be applied to the first electrode of the driving transistor T1 (i.e., the bias operation). That is, the anode electrode of the light emitting element EE may be initialized, and the bias of the driving transistor T1 may be on-bias.

The voltage generator 600 may decrease the bias voltage VOBS after the frame stop period IFP. That is, the bias voltage VOBS applied after the frame stop period IFP may be smaller than the bias voltage VOBS applied before the frame stop period IFP.

If the bias voltage VOBS is the same before and after the frame stop period IFP, the difference in the luminance may occur between the first pixels P1 and the second pixels P2 due to the difference in the bias time. However, by reducing the bias voltage VOBS after the frame stop period IFP, the bias of the second pixels P2 may be quickly turned on-bias. Accordingly, the display device may compensate for the insufficient bias time of the second pixel P2 compared to the first pixel P1. Accordingly, the display device may minimize or reduce the difference in luminance occurring before and after the frame stop period IFP.

Figure 7:
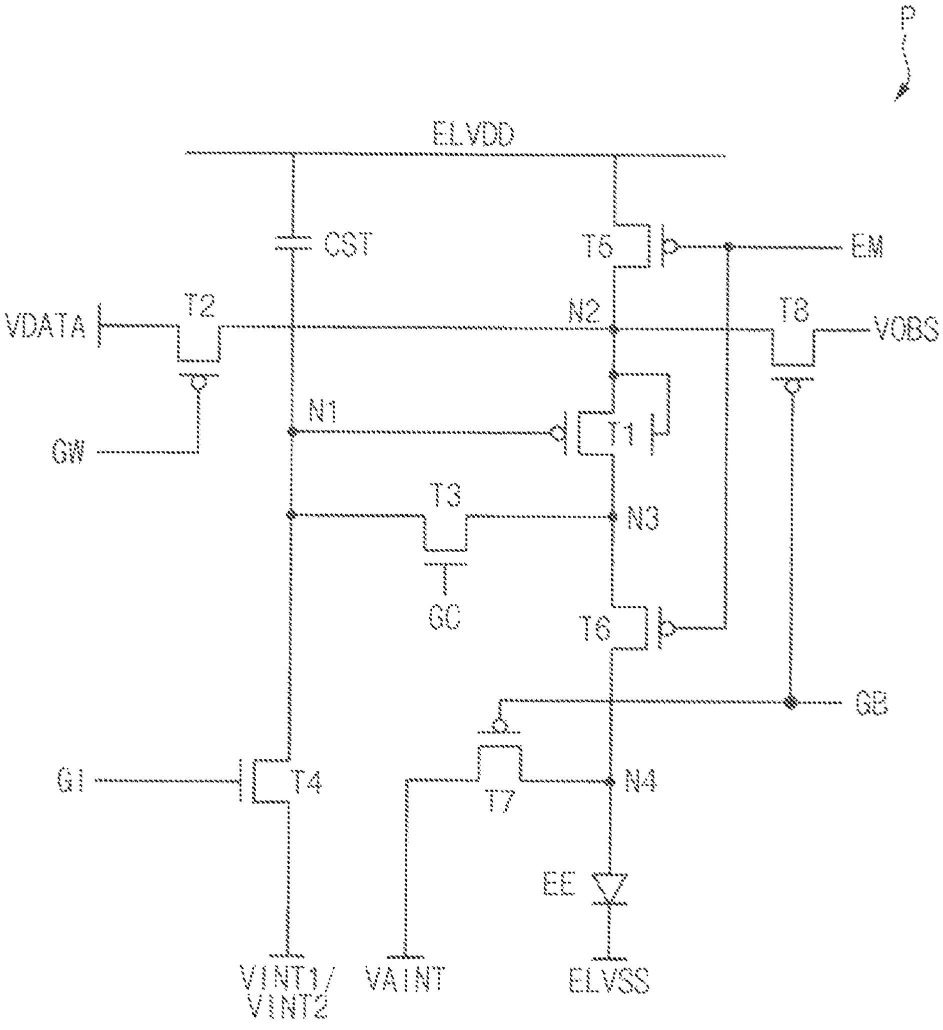
FIG. 7 is a circuit diagram illustrating an example of pixels of a display device according to some embodiments of the present inventive concept.
Figure 8:
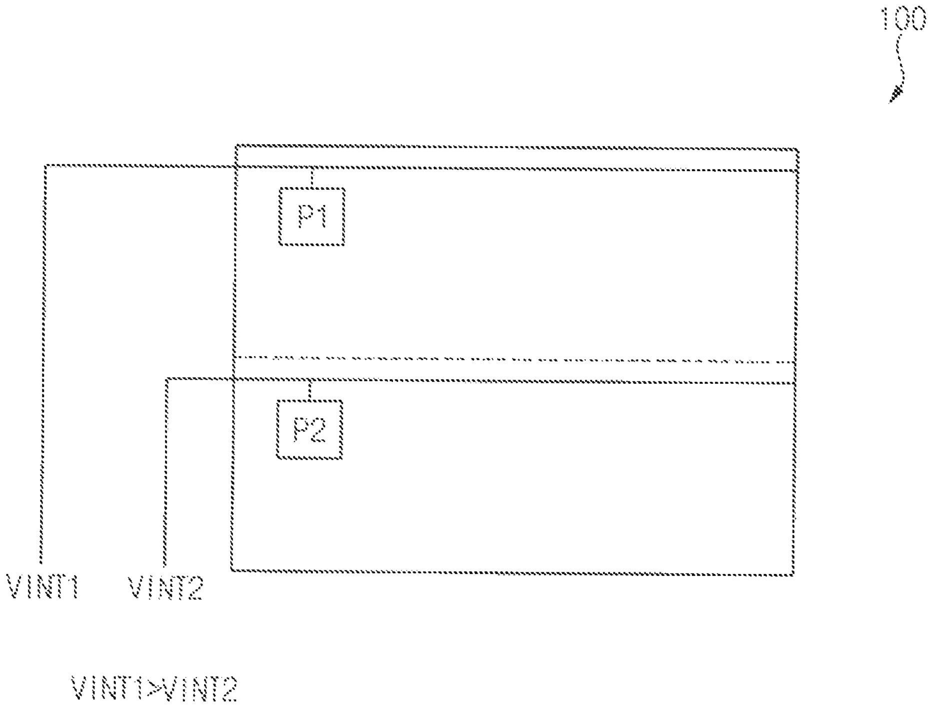
FIG. 8 is a block diagram illustrating an example of first pixels and second pixels of the display device of FIG. 7.

FIG. 7 is a circuit diagram illustrating an example of the pixels P of a display device according to some embodiments of the present inventive concept, and FIG. 8 is a block diagram illustrating an example of the first pixels P1 and the second pixels P2 of the display device of FIG. 7.

The display device according to some embodiments is substantially the same as the display device of FIG. 1 except for the bias voltage VOBS and the gate initialization voltage VINT. Thus, the same reference numerals are used to refer to the same or similar element, and any repetitive explanation will be omitted.

Referring to FIGS. 1, 4, 7, and 8, each of the pixels P may include the fourth transistor T4 including a control electrode receiving the initialization gate signal GI, a first electrode receiving the first gate initialization voltage VINT1 or the second gate initialization voltage VINT2, and a second electrode connected to the first node N1, and a eighth transistor T8 including a control electrode receiving the bias gate signal GB, a first electrode receiving the bias voltage VOBS, and a second electrode connected to the second node N2.

For example, in the initialization period, the initialization gate signal GI may have the activation level, and the fourth transistor T4 may be turned on. Accordingly, the first gate initialization voltage VINT1 or the second gate initialization voltage VINT2 may be applied to the control electrode (i.e., the first node N1) of the driving transistor T1 (i.e., the gate initialization operation). That is, the control electrode of the driving transistor T1 (i.e., the data voltage VDATA written to the storage capacitor CST) may be initialized.

For example, in the bias period, the bias gate signal GB may have the activation level, and the seventh transistor T7 and the eighth transistor T8 may be turned on. Accordingly, the anode initialization voltage VATIN may be applied to the first electrode (i.e., the anode electrode) of the light emitting element EE (i.e., the anode initialization operation), and the bias voltage VOBS may be applied to the first electrode of the driving transistor T1 (i.e., the bias operation). That is, the anode electrode of the light emitting element EE may be initialized, and the bias of the driving transistor T1 may be on-bias.

The voltage generator 600 may apply the first gate initialization voltage VINT1 to the first pixels P1 to which the data voltages VDATA are written before the frame stop period IFP among the pixels P, and may apply the second gate initialization voltage VINT2 to the second pixels P2 in which the data voltages VDATA are written after the frame stop period IFP among the pixels P. For example, the first gate initialization voltage VINT1 may be applied to the control electrode of the driving transistor T1 of each of the first pixels P1 in response to the initialization gate signal GI. For example, the second gate initialization voltage VINT2 may be applied to the control electrode of the driving transistor T1 of each of the second pixels P2 in response to the initialization gate signal GI. The second gate initialization voltage VINT2 may be greater than the first gate initialization voltage VINT1.

For example, as shown in FIG. 8, the voltage generator 600 may provide the first gate initialization voltage VINT1 and the second gate initialization voltage VINT2 to the first pixels P1 and the second pixels P2 through separate voltage lines. Accordingly, the first gate initialization voltage VINT1 may be applied only to the first pixels P1, and the second gate initialization voltage VINT2 may be applied only to the second pixels P2.

If the first gate initialization voltage VINT1 and the second gate initialization voltage VINT2 are the same, the difference in luminance may occur between the first pixels P1 and the second pixels P2 due to the difference in the bias time. However, because the second gate initialization voltage VINT2 greater than the first gate initialization voltage VINT1 is applied to the second pixels P2, a voltage of the control electrode of the driving transistor T1 of the second pixels P2 may be increased. Accordingly, because the driving transistor T1 is the PMOS transistor, the driving current of the second pixels P2 may be smaller than the driving current of the first pixels P1. Accordingly, the display device may minimize or reduce the difference in luminance occurring before and after the frame stop period IFP.

Figure 9:
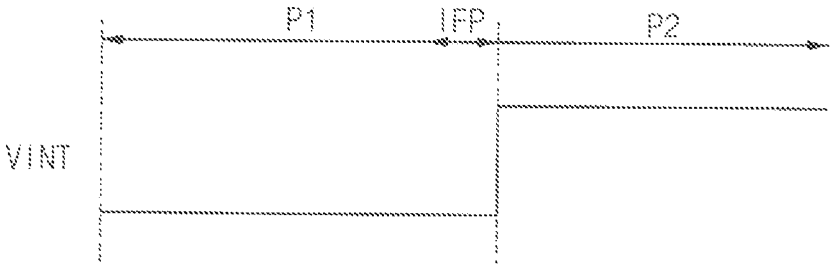
FIG. 9 is a diagram illustrating an example of a gate initialization voltage of a display device according to some embodiments of the present inventive concept.

FIG. 9 is a diagram illustrating an example of the gate initialization voltage VINT of a display device according to some embodiments of the present inventive concept.

The display device according to some embodiments is substantially the same as the display device of FIG. 5 except for varying the gate initialization voltage VINT instead of the bias voltage VOBS. Thus, the same reference numerals are used to refer to the same or similar element, and any repetitive explanation will be omitted.

Referring to FIGS. 1, 5, and 9, the voltage generator 600 may apply the gate initialization voltage VINT to the pixels P, and may vary the gate initialization voltage VINT after the frame stop period IFP. However, embodiments according to the present inventive concept are not limited thereto. For example, according to some embodiments of the present inventive concept, the gate initialization voltage VINT may be varied when the frame stop period IFP starts.

The voltage generator 600 may increase the gate initialization voltage VINT after the frame stop period IFP. That is, the gate initialization voltage VINT applied after the frame stop period IFP may be greater than the gate initialization voltage VINT applied before the frame stop period IFP.

If the gate initialization voltage VINT is the same before and after the frame stop period IFP, the difference in luminance may occur between the first pixels P1 and the second pixels P2 due to the difference in the bias time. However, by increasing the gate initialization voltage VINT after the frame stop period IFP, the voltage of the control electrode of the driving transistor T1 of the second pixels P2 may be increased. Accordingly, because the driving transistor T1 is the PMOS transistor, the driving current of the second pixels P2 may be smaller than the driving current of the first pixels P1. So, the display device may minimize or reduce the difference in luminance occurring before and after the frame stop period IFP.

Figure 10:
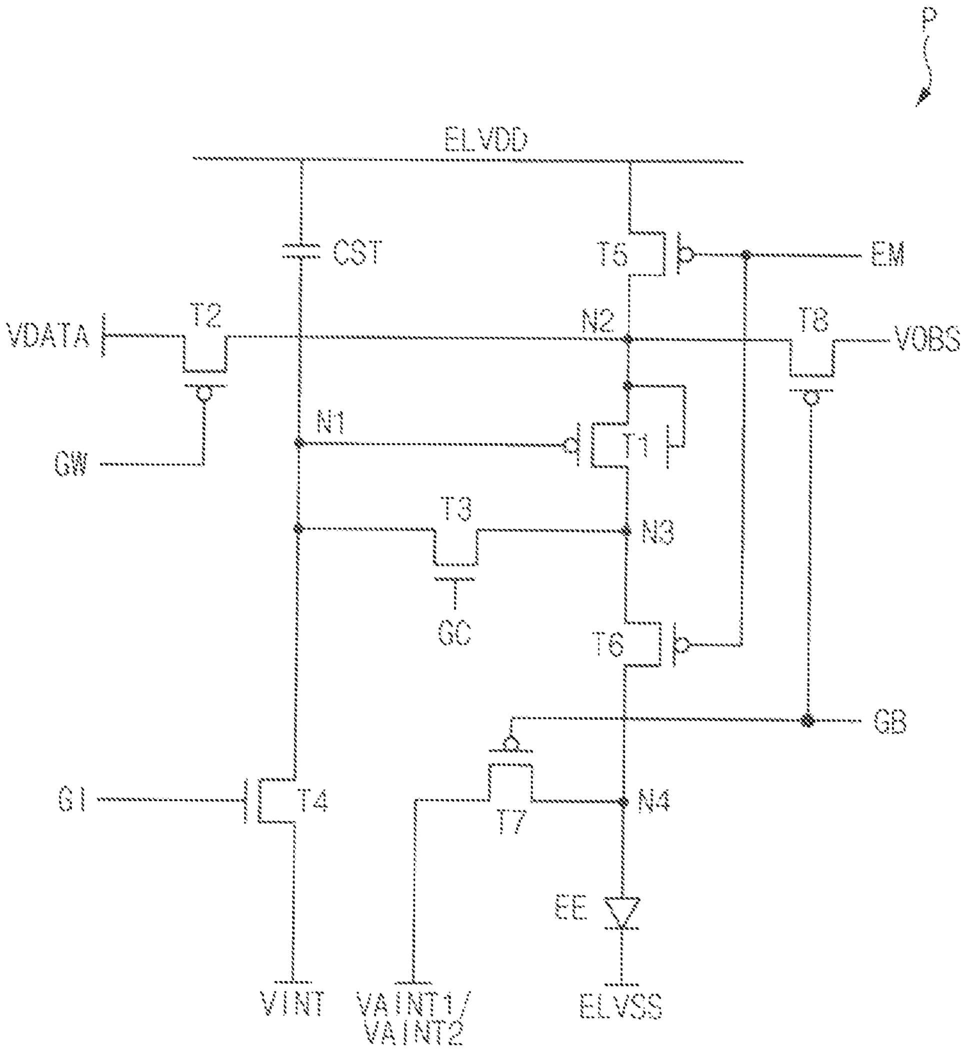
FIG. 10 is a circuit diagram illustrating an example of pixels of a display device according to some embodiments of the present inventive concept.
Figure 11:
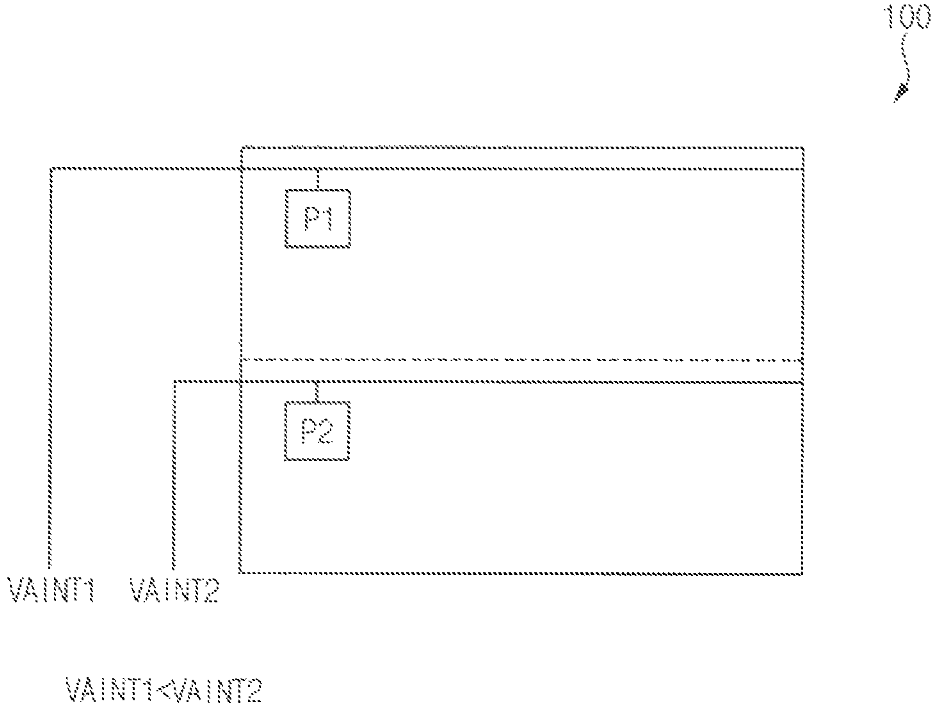
FIG. 11 is a block diagram illustrating an example of first pixels and second pixels of the display device of FIG. 10.

FIG. 10 is a circuit diagram illustrating an example of the pixels P of a display device according to some embodiments of the present inventive concept, and FIG. 11 is a block diagram illustrating an example of the first pixels P1 and the second pixels P2 of the display device of FIG. 10.

The display device according to some embodiments is substantially the same as the display device of FIG. 1 except for the bias voltage VOBS and the anode initialization voltage VAINT. Thus, the same reference numerals are used to refer to the same or similar element, and any repetitive explanation will be omitted.

Referring to FIGS. 1, 4, 10, and 11, each of the pixels P may include a fourth transistor T4 including a control electrode receiving the bias gate signal GB, a first electrode receiving the first anode initialization voltage VAINT1 or the second anode initialization voltage VAINT2, and a second electrode connected to the fourth node N4, and an eighth transistor T8 including a control electrode receiving the bias gate signal GB, a first electrode receiving the bias voltage VOBS, and a second electrode connected to the second node N2.

For example, in the bias period, the bias gate signal GB may have the activation level, and the seventh transistor T7 and the eighth transistor T8 may be turned on. Accordingly, the first anode initialization voltage VATIN1 or the second anode initialization voltage VAINT2 may be applied to the first electrode (i.e., the anode electrode) of the light emitting element EE (i.e., the anode initialization operation), and the bias voltage VOBS may be applied to the first electrode of the driving transistor T1 (i.e., the bias operation). That is, the anode electrode of the light emitting element EE may be initialized, and the bias of the driving transistor T1 may be on-bias.

The voltage generator 600 may apply the first anode initialization voltage VAINT1 to the first pixels P1 in which the data voltages VDATA are written before the frame stop period IFP among the pixels P, and may apply the second anode initialization voltage VAINT2 to the second pixels P2 in which the data voltages VDATA are written after the frame stop period IFP among the pixels P. For example, the first anode initialization voltage VAINT1 may be applied to the light emitting element EE of each of the first pixels P1 in response to the bias gate signal GB. For example, the second anode initialization voltage VAINT2 may be applied to the light emitting element EE of each of the second pixels P2 in response to the bias gate signal GB. The second anode initialization voltage VAINT2 may be smaller than the first anode initialization voltage VAINT1.

For example, as shown in FIG. 11, the voltage generator 600 may provide the first anode initialization voltage VAINT1 and the second anode initialization voltage VAINT2 to the first pixels P1 and the second pixels P2 through separate voltage lines. Accordingly, the first anode initialization voltage VAINT1 may be applied only to the first pixels P1, and the second anode initialization voltage VAINT2 may be applied only to the second pixels P2.

As shown in FIG. 4, an anode initialization time of the second pixels P2 may be shorter than an anode initialization time of the first pixels P1. The anode initialization time may be a time from when the anode initialization operation is performed until the light emission operation is performed. For example, the anode initialization time may be a time from when the bias gate signal GB becomes the activation level until the emission signal EM becomes the activation level.

That is, if the first anode initialization voltage VAINT1 and the second anode initialization voltage VAINT2 are the same, the difference in luminance occurs between the first pixels P1 and the second pixels P2 due to the difference in the anode initialization time. However, because the second anode initialization voltage VAINT2 smaller than the first anode initialization voltage VAINT1 is applied to the second pixels P2, the second pixels P2 may be initialized quickly. Accordingly, the display device may compensate for the insufficient anode initialization time of the second pixel P2 compared to the first pixel P1. Accordingly, the display device may minimize or reduce the difference in luminance occurring before and after the frame stop period IFP.

Figure 12:
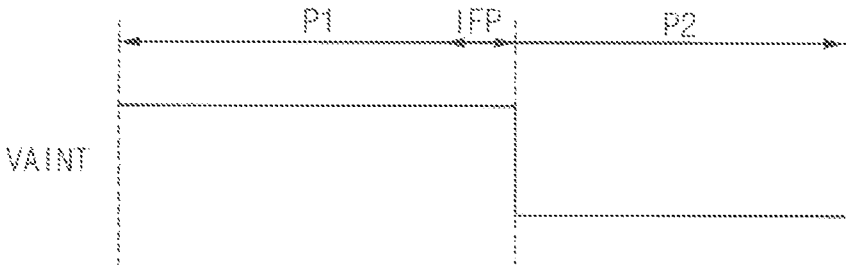
FIG. 12 is a diagram illustrating an example of an anode initialization voltage of a display device according to some embodiments of the present inventive concept.

FIG. 12 is a diagram illustrating an example of the anode initialization voltage VAINT of a display device according to some embodiments of the present inventive concept.

The display device according to some embodiments is substantially the same as the display device of FIG. 5 except for varying the anode initialization voltage VAINT instead of the bias voltage VOBS. Thus, the same reference numerals are used to refer to the same or similar element, and any repetitive explanation will be omitted.

Referring to FIGS. 1, 5, and 12, the voltage generator 600 may apply the anode initialization voltage VAINT to the pixels P, and may vary the anode initialization voltage VAINT after the frame stop period IFP. However, the present inventive concept is not limited thereto. For example, the present inventive concept may vary the anode initialization voltage VAINT when the frame stop period IFP starts.

The voltage generator 600 may decrease the anode initialization voltage VAINT after the frame stop period IFP. That is, the anode initialization voltage VAINT applied after the frame stop period IFP may be smaller than the anode initialization voltage VAINT applied before the frame stop period IFP.

If the anode initialization voltage VAINT is the same before and after the frame stop period IFP, the difference in luminance may occur between the first pixels P1 and the second pixels P2 due to the difference in the anode initialization time. However, by reducing the anode initialization voltage VAINT after the frame stop period IFP, the second pixels P2 may be initialized quickly. Accordingly, the display device may compensate for the insufficient anode initialization time of the second pixel P2 compared to the first pixel P1. Accordingly, the display device may minimize or reduce the difference in luminance occurring before and after the frame stop period IFP.

Figure 13:
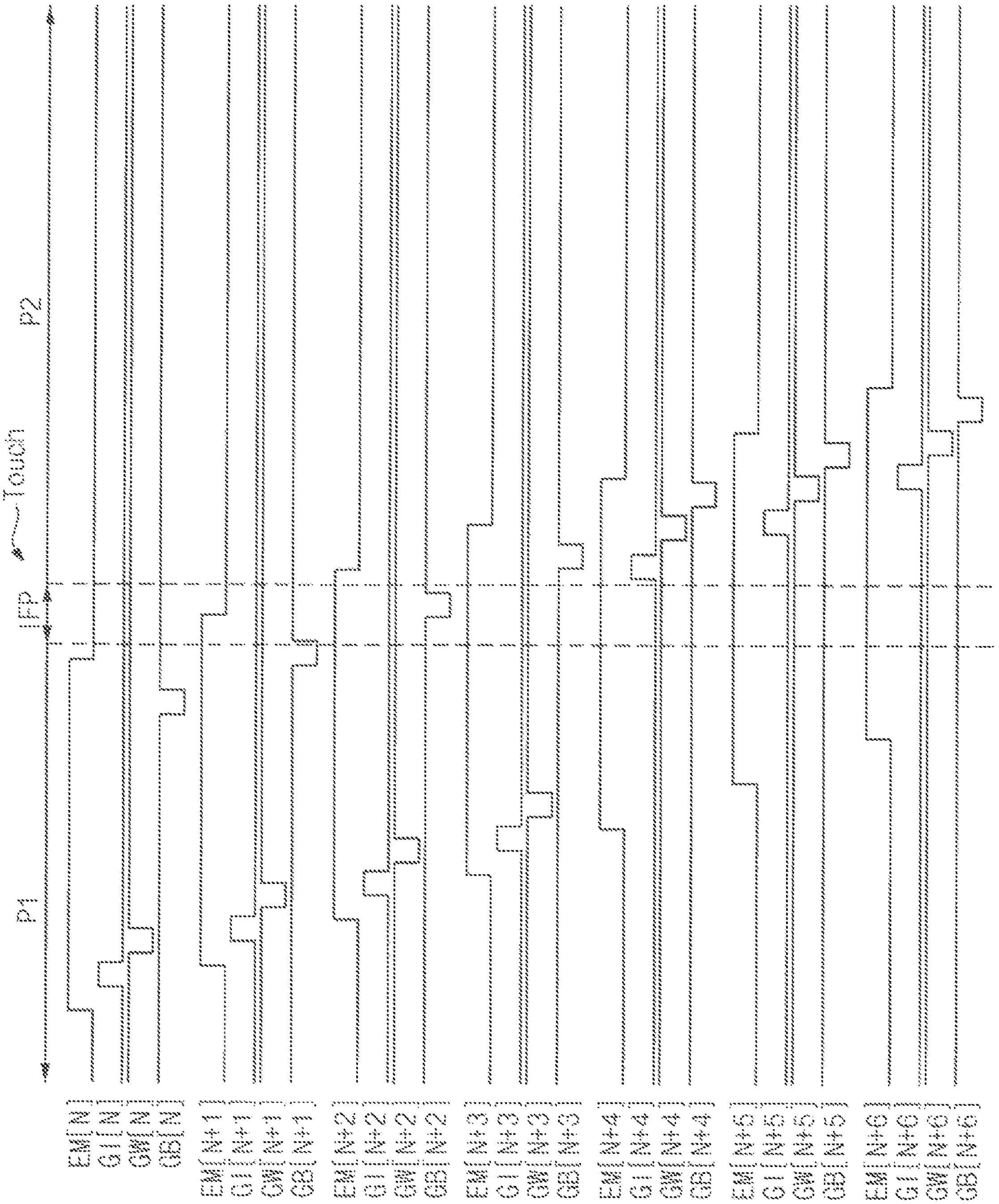
FIG. 13 is a timing diagram illustrating an example in which a display device according to some embodiments of the present inventive concept is driven in one frame.

FIG. 13 is a timing diagram illustrating an example in which a display device according to some embodiments of the present inventive concept is driven in one frame.

The display device according to some embodiments is substantially the same as the display device of FIG. 5 except for the bias gate signal GB and not varying the bias voltage VOBS. Thus, the same reference numerals are used to refer to the same or similar element, and any repetitive explanation will be omitted.

Referring to FIGS. 1, 5, and 13, FIG. 13 illustrates that the emission signal EM is sequentially applied to the Nth to N+6th emission lines EL (e.g., EM[N], EM[N+1], EM[N+6]). FIG. 4 illustrates that the write gate signal GW is sequentially applied to the Nth to N+6th gate lines GL (e.g., GW[N], GW[N+1], GW[N+6]). FIG. 4 illustrates that the bias gate signal GB is sequentially applied to the Nth to N+6th gate lines GL (e.g., GB[N], GB[N+1], GB[N+6]).

The gate driver 300 may output the write gate signal GW having the inactivation level in the frame stop period IFP and output the bias gate signal GB having the activation level in the frame stop period IFP. The emission driver 500 may output the emission signal EM having the activation level. For example, the timing controller 200 temporarily suspends output of the write gate signal GW in the frame stop period IFP, may maintain the output of the bias gate signal GB in the frame stop period IFP, and may maintain the output of the emission signal EM in the frame stop period IFP.

For example, the gate initialization operation and the data writing operation may be sequentially performed up to the N+2th pixel row. Thereafter, in the frame stop period IFP, the timing controller 200 may stop the gate initialization operation and the data writing operation, and may perform the touch sensing operation. After the frame stop period IFP ends, the gate initialization operation and the data writing operation may be sequentially performed from the N+3th pixel row. On the other hand, the anode initialization operation, the bias operation, and the light emission operation may be performed regardless of the frame stop period IFP. That is, the bias gate signal GB and the emission signal EM may be sequentially output regardless of the frame stop period IFP.

A time between an activation timing of the bias gate signal GB and an activation timing of the emission signal EM may be constant. Consequently, the display device may have the same anode initialization time and the same bias time of the first pixels P1 and the second pixels P2. That is, in the display device, the anode initialization time and the bias time of all pixels P may be the same. Accordingly, the display device may minimize or reduce the difference in luminance occurring before and after the frame stop period IFP.

FIGS. 1 to 13 illustrates embodiments in which the difference in luminance is minimized or reduced through the bias voltage VOBS (or, the first bias voltage VOBS1 and the second bias voltage VOBS2), the gate initialization voltage VINT (or, the first gate initialization voltage VINT1 and the second gate initialization voltage VINT2), the anode initialization voltage VAINT (or, the first anode initialization voltage VAINT1 and the second anode initialization voltage VAINT2), or the bias gate signal GB. However, the present inventive concept is not limited thereto. For example, the display device may minimize or reduce the difference in luminance by using a combination of the above embodiments.

Figure 14:
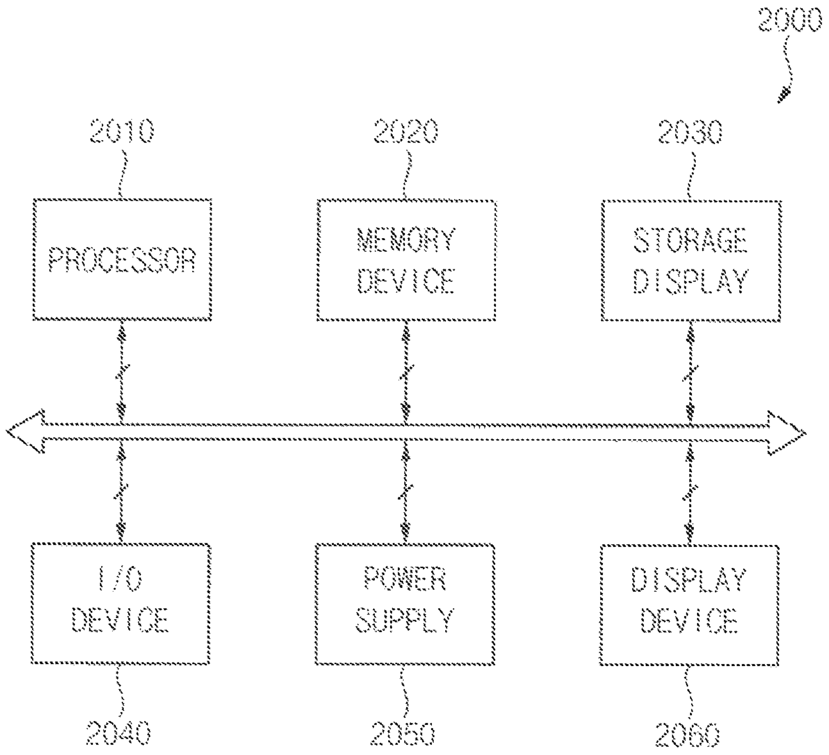
FIG. 14 is a block diagram showing an electronic device according to some embodiments of the present inventive concept.
Figure 15:
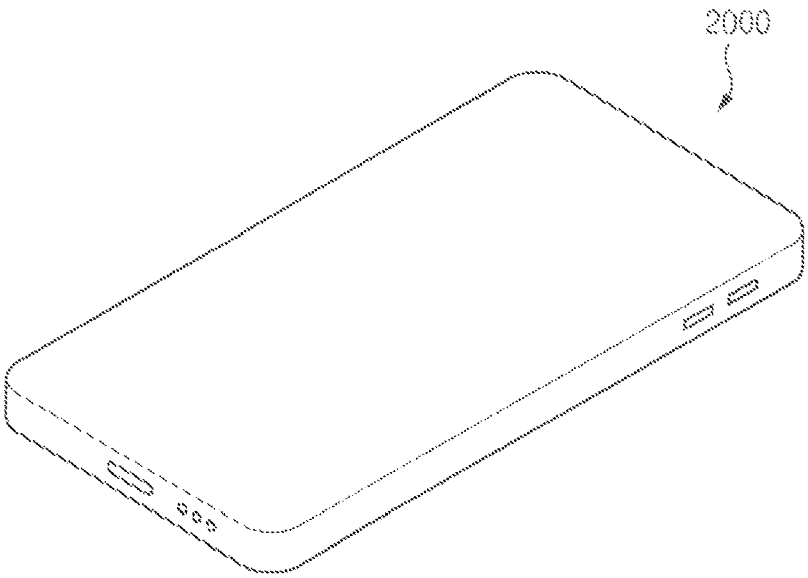
FIG. 15 is a diagram showing an example in which the electronic device of FIG. 14 is implemented as a smart phone.

FIG. 14 is a block diagram showing an electronic device according to some embodiments of the present inventive concept, and FIG. 15 is a diagram showing an example in which the electronic device of FIG. 14 is implemented as a smart phone.

Referring to FIGS. 14 and 15, the electronic device 2000 may include a processor 2010, a memory device 2020, a storage device 2030, an input/output (I/O) device 2040, a power supply 2050, and a display device 2060. Here, the display device 2060 may be the display device of FIG. 1. In addition, the electronic device 2000 may further include a plurality of ports for communicating with a video card, a sound card, a memory card, a universal serial bus (USB)

device, other electronic devices, etc. According to some embodiments, as shown in FIG. 15, the electronic device 2000 may be implemented as a smart phone. However, the electronic device 2000 is not limited thereto. For example, the electronic device 2000 may be implemented as a cellular phone, a video phone, a smart pad, a smart watch, a tablet PC, a car navigation system, a computer monitor, a laptop, a head mounted display (HMD) device, etc.

The processor 2010 may perform various computing functions. The processor 2010 may be a micro processor, a central processing unit (CPU), an application processor (AP), etc. The processor 2010 may be coupled to other components via an address bus, a control bus, a data bus, etc. Further, the processor 2010 may be coupled to an extended bus such as a peripheral component interconnection (PCI) bus.

The memory device 2020 may store data for operations of the electronic device 2000. For example, the memory device 2020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc and/or at least one volatile memory device such as a dynamic random access memory (DRAM) device, a static random access memory (SRAM) device, a mobile DRAM device, etc.

The storage device 2030 may include a solid state drive (SSD) device, a hard disk drive (HDD) device, a CD-ROM device, etc.

The I/O device 2040 may include an input device such as a keyboard, a keypad, a mouse device, a touch pad, a touch screen, etc, and an output device such as a printer, a speaker, etc. In some embodiments, the I/O device 2040 may include the display device 2060.

The power supply 2050 may provide power for operations of the electronic device 2000. For example, the power supply 2050 may be a power management integrated circuit (PMIC).

The display device 2060 may display an image corresponding to visual information of the electronic device 2000. For example, the display device 2060 may be an organic light emitting display device or a quantum dot light emitting display device, but is not limited thereto. The display device 2060 may be coupled to other components via the buses or other communication links. Here, the display device 2060 may compensate for the insufficient bias time of the second pixels compared to the first pixels. Accordingly, the display device may minimize or reduce the difference in luminance occurring before and after the frame stop period.

The inventive concepts may be applied to any electronic device including the display device. For example, the inventive concepts may be applied to a television (TV), a digital TV, a 3D TV, a mobile phone, a smart phone, a tablet computer, a virtual reality (VR) device, a wearable electronic device, a personal computer (PC), a home appliance, a laptop computer, a personal digital assistant (PDA), a portable multimedia player (PMP), a digital camera, a music player, a portable game console, a navigation device, etc.

The foregoing is illustrative of the present inventive concept and is not to be construed as limiting thereof. Although aspects of some embodiments of the present inventive concept have been described, those skilled in the art will readily appreciate that many modifications are possible in the example embodiments without materially departing from the novel teachings and characteristics of some embodiments of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific example embodiments disclosed, and that modifications to the disclosed example embodiments, as well as other example embodiments, are intended to be included within the scope of the appended claims, and their equivalents. The present inventive concept is defined by the following claims, with equivalents of the claims to be included therein.

What is claimed is:

1. A display device comprising:

a display panel including pixels;

a data driver configured to output data voltages to the pixels;

a gate driver configured to output a write gate signal to write the data voltages to the pixels having an inactivation level in a frame stop period;

a timing controller configured to control the data driver and the gate driver;

an emission driver configured to output an emission signal to the pixels; and a voltage generator configured to apply a first bias voltage to first pixels to which the data voltages are written before the frame stop period among the pixels, and to apply a second bias voltage to second pixels, different from the first pixels and to which the first bias voltage is not applied, to which the data voltages are written after the frame stop period among the pixels, wherein each of the pixels includes a driving transistor, wherein the gate driver is configured to output a bias gate signal to the pixels, wherein the first bias voltage is applied to the driving transistor of each of the first pixels in response to the bias gate signal, wherein the second bias voltage is applied to the driving transistor of each of the second pixels in response to the bias gate signal, wherein the timing controller is configured to maintain an output of the emission signal in the frame stop period, wherein the timing controller is configured to maintain an output of the bias gate signal in the frame stop period, and wherein a time between an activation timing of the bias gate signal and an activation timing of the emission signal is constant.

2. The display device of claim 1, wherein the second bias voltage is smaller than the first bias voltage.

3. The display device of claim 1, wherein the bias gate signal has an inactivation level in the frame stop period.

4. The display device of claim 1, wherein the voltage generator is configured to apply a first gate initialization voltage to the first pixels and to apply a second gate initialization voltage to the second pixels, wherein the gate driver is configured to output an initialization gate signal to the pixels, wherein the first gate initialization voltage is applied to a control electrode of the driving transistor of each of the first pixels in response to the initialization gate signal, and wherein the second gate initialization voltage is applied to the control electrode of the driving transistor of each of the second pixels in response to the initialization gate signal.

5. The display device of claim 4, wherein the second gate initialization voltage is greater than the first gate initialization voltage.

6. The display device of claim 4, wherein the initialization gate signal has an inactivation level in the frame stop period.

7. The display device of claim 1, wherein the voltage generator is configured to apply a first anode initialization voltage to the first pixels and to apply a second anode initialization voltage to the second pixels, wherein each of the pixels includes a light emitting element, wherein the first anode initialization voltage is applied to the light emitting element of each of the first pixels in response to the bias gate signal, and wherein the second anode initialization voltage is applied to the light emitting element of each of the second pixels in response to the bias gate signal.

8. The display device of claim 7, wherein the second anode initialization voltage is smaller than the first anode initialization voltage.

9. The display device of claim 1, wherein the timing controller is configured to perform a touch sensing operation in the frame stop period.

10. A display device comprising:

a display panel including pixels;

a data driver configured to output data voltages to the pixels;

a gate driver configured to output a write gate signal to write the data voltages to the pixels having an inactivation level in a frame stop period;

a timing controller configured to control the data driver and the gate driver; and a voltage generator configured to apply a first bias voltage to first pixels from among the pixels and to apply a second bias voltage to second pixels, different from the first pixels and to which the first bias voltage is not applied, after the frame stop period, wherein the voltage generator is configured to apply a gate initialization voltage to the pixels, and to vary the gate initialization voltage after the frame stop period, wherein each of the pixels includes a driving transistor, wherein the gate driver is configured to output an initialization gate signal to the pixels, and wherein the gate initialization voltage is applied to a control electrode of the driving transistor of each of the pixels in response to the initialization gate signal.

11. The display device of claim 10, wherein the second bias voltage is lower than the first bias voltage.

12. The display device of claim 10 wherein the voltage generator is configured to increase the gate initialization voltage after the frame stop period.

13. A display device comprising:

a display panel including pixels;

a data driver configured to output data voltages to the pixels;

a gate driver configured to output a write gate signal to write the data voltages to the pixels having an inactivation level in a frame stop period;

a timing controller configured to control the data driver and the gate driver; and a voltage generator configured to apply a first bias voltage to first pixels from among the pixels and to apply a second bias voltage to second pixels, different from the first pixels and to which the first bias voltage is not applied, after the frame stop period, wherein the voltage generator is configured to apply an anode initialization voltage to the pixels, and to vary the anode initialization voltage after the frame stop period, wherein each of the pixels includes a light emitting element, wherein the gate driver is configured to output a bias gate signal to the pixels, and wherein the anode initialization voltage is applied to the light emitting element of each of the pixels in response to the bias gate signal.

14. The display device of claim 13, wherein the voltage generator is configured to decrease the anode initialization voltage after the frame stop period.

15. A display device comprising:

a display panel including pixels;

a data driver configured to output data voltages to the pixels;

a gate driver configured to output a write gate signal to write the data voltages to the pixels having an inactivation level in a frame stop period and to output a bias gate signal to apply a bias voltage to a driving transistor included in each of the pixels having an activation level;

an emission driver configured to output an emission signal to the pixels;

a timing controller configured to control the data driver, the gate driver, and the emission driver; and a voltage generator configured to apply the bias voltage to the pixels, wherein a time between an activation timing of the bias gate signal and an activation timing of the emission signal is constant.

* * * * *